US007339732B2

(12) United States Patent
Parusel et al.

(10) Patent No.: US 7,339,732 B2
(45) Date of Patent: Mar. 4, 2008

(54) SCRATCH-RESISTANT REAR PROJECTION SCREEN AND METHOD FOR PRODUCING THE SAME

(75) Inventors: Markus Parusel, Messel (DE); Jann Schmidt, Rockaway, NJ (US); Herbert Groothues, Weiterstadt (DE); Christoph Krohmer, Stockstadt (DE); Guenther Dickhaut-Bayer, Riedstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 189 days.

(21) Appl. No.: 10/566,244

(22) PCT Filed: Mar. 12, 2004

(86) PCT No.: PCT/EP2004/002599

§ 371 (c)(1),
(2), (4) Date: Jan. 30, 2006

(87) PCT Pub. No.: WO2005/022253

PCT Pub. Date: Mar. 10, 2005

(65) Prior Publication Data

US 2006/0209403 A1    Sep. 21, 2006

(30) Foreign Application Priority Data

Aug. 4, 2003 (DE) ................ 103 36 129

(51) Int. Cl.
  G03B 21/60    (2006.01)
  G03B 21/56    (2006.01)
(52) U.S. Cl. ..................... 359/453; 359/460
(58) Field of Classification Search ........... 359/443, 359/452, 453, 460
See application file for complete search history.

(56) References Cited

U.S. PATENT DOCUMENTS

| 6,011,643 | A  | * | 1/2000  | Wunderlich et al. ........ 359/279 |
| 6,144,491 | A  | * | 11/2000 | Orikasa et al. ............ 359/452 |
| 6,342,121 | B1 |   | 1/2002  | Ito et al.                          |
| 6,747,796 | B1 | * | 6/2004  | Dorling .................... 359/452 |
| 6,760,155 | B2 | * | 7/2004  | Murayama et al. ......... 359/453 |
| 2001/0015846 | A1 |   | 8/2001 | Morris et al. |
| 2002/0109916 | A1 |   | 8/2002 | Moshrefzadeh |
| 2003/0053207 | A1 |   | 3/2003 | Ballen et al. |
| 2004/0257650 | A1 |   | 12/2004 | Parusel et al. |
| 2005/0084993 | A1 |   | 4/2005 | Schmidt et al. |
| 2006/0240200 | A1 |   | 1/2006 | Parusel et al. |

FOREIGN PATENT DOCUMENTS

| EP | 0 561 551   | 9/1993  |
| EP | 1 152 286   | 11/2001 |
| JP | 4-134440    | 5/1992  |
| JP | 5-51480     | 3/1993  |
| JP | 7-234304    | 9/1995  |
| JP | 8-198976    | 8/1996  |
| JP | 11-179856   | 7/1999  |
| JP | 2000-296580 | 10/2000 |

OTHER PUBLICATIONS

U.S. Appl. No. 10/566,370, filed Jan. 30, 2006, Parusel et al.

* cited by examiner

*Primary Examiner*—Christopher Mahoney
(74) *Attorney, Agent, or Firm*—Oblon, Spivak, McClelland, Maier & Neustadt, P.C.

(57) ABSTRACT

The present invention relates to a rear-projection screen encompassing at least one light-scattering polymethyl methacrylate layer, which comprises a polymethyl methacrylate matrix and spherical scattering particles (A) and spherical particles (B) with a different median particle size $V_{50}$, where the spherical scattering particles (A) have a median size $V_{50}$ in the range from 0.1 to 40 μm, the difference between the refractive index of the spherical scattering particles (A) and that of the polymethyl methacrylate matrix being in the range from 0.02 to 0.2, where the spherical particles (B) have a median size $V_{50}$ in the range from 10 to 150 μm, the difference between the refractive index of the spherical particles (B) and that of the polymethyl methacrylate matrix being in the range from 0 to 0.2, and where the total concentration of the spherical scattering particles (A) and particles (B) is in the range from 1 to 60% by weight, based on the weight of the light-scattering polymethyl methacrylate layer, where the concentration of the spherical scattering particles (A) $c_{PA}$, the thickness of the light-scattering polymethyl methacrylate layer $d_S$ and the size of the spherical scattering particles (A) $D_{PA}$ is selected in such a way that the ratio $c_{PA}*d_S/D_{PA}^3$ is in the range from 0.001 to 0.015% by weight*mm/μm³, the concentration of the spherical particles (B) $c_{PB}$, the thickness of the light-scattering polymethyl methacrylate layer $d_S$ and the size of the spherical particles (B) $D_{PB}$ is selected in such a way that the ratio $c_{PB}*d_S/D_{PB}^3$ is in the range from 0.000005 to 0.002% by weight*mm/μm³ and the ratio of the square of average surface roughness of the polymethyl methacrylate layer $R_Z$ to the third power of the size of the spherical particles (B) $R_Z^2/D_{PB}^3$ is in the range from 0.0002 to 0.1300 μm$^{-1}$.

26 Claims, No Drawings

SCRATCH-RESISTANT REAR PROJECTION SCREEN AND METHOD FOR PRODUCING THE SAME

The present invention relates to scratch-resistant rear-projection screens encompassing at least one light-scattering polymethyl methacrylate layer, to a process for producing these rear-projection screens, and to use.

Using the technique of rear projection, information can be made available to a wide audience. In principle, the structure of this type of system is composed of an image surface which is illuminated from the rear by a projector and thus provides the information.

Examples of the use of this technique are found in control rooms (power stations, railways), where they make it easier for those responsible to gain an overview of the complex processes, thus permitting avoidance of control errors. Another application is given by display panels in, for example, sports stadia and at motor-racing events. Here, the spectators are given information about progress and events as they occur, even if they are very distant from the action itself.

These image surfaces are very large. Constant technical advances (projector technology) have added other fields of application over the years.

For example, this type of information provision is also used in, for example, TV equipment, large-scale cinemas and home cinemas, and as a promotional medium at exhibitions, in window displays, and in shops.

This technique is moreover also used to provide information during presentations and in flight simulators, where the virtual environment is depicted on the cockpit screen with maximum simulation of reality.

A source of many advantages of this technique is that the projector is outside the viewing space. This means that projection is not interrupted by any observer located in front of the projection surface, and distracting noises from the projector are eliminated, and the room can be attractively designed.

There is now a wide variety of plastic sheets and foils which are used in rear-projection technology. Sheets are often modified to give them defined surface structures in the form of Fresnel lens systems on the rear side and also vertically arranged lenticular lenses on the observer side. The production of these rear-projection panels is therefore expensive. The surface structures can moreover be very sensitive to mechanical load. Damage causes very great impairment of the appearance of the projected image.

There are also known rear-projection sheets and foils which comprise scattering media, these sheets comprising particles whose refractive index differs from that of the matrix. The sheets and foils are likewise suitable for rear projection, but each does not cover the entire range of requirements, and therefore only some of the requirements placed upon a screen are met.

Because of the large number of different possible uses, a very wide variety of requirements are placed upon the projection surface. By way of example, in one application the projection surfaces have to provide a very steady, clear and high-resolution reproduction of the image, because the observer here has to take in the information over a prolonged period (example: control rooms, home cinema, etc.).

When these projection surfaces are used for presentation and promotional purposes, for example on exhibition stands, the surfaces then have to be particularly resistant to mechanical load and soiling, while the requirements for projection quality are not so high.

By way of example, sheets and films which provide a high light-scattering angle can be produced using known scattering media, such as barium sulphate and titanium dioxide. The projection resolution is likewise high. The viewing angle for the image should likewise be correspondingly high. However, it is found that the actual image sharpness of the projection sheets is less than ideal, while the other required properties, such as scratch resistance, are inadequate for many requirements.

There are also known screens which comprise plastics particles as scattering media. For example, the document JP11179856 describes multilayer sheets with at least one layer which encompasses a polymethyl methacrylate matrix and also encompasses crosslinked polymethyl methacrylate beads as scattering/matting agent, the proportion of the beads being in the range from 0.5 to 25% by weight. The size of the beads is in the range from 3 to 30 µm, and the examples describe merely sheets of thickness 2 mm which comprise about 3% by weight of scattering beads whose size is about 6 µm. The scratch resistance of these screens is problematic.

The Japanese laid-open specification JP 07234304 describes a mixture of crosslinked acrylate-styrene beads (14 µm) in a transparent plastic. A disadvantage of these screens is that scratches are highly visible.

There are also known sheets which encompass mixtures of particles. The specification JP 4-134440 describes sheets which use two types of particles, where the size of these and their difference in refractive index with respect to the matrix have to be appropriately mutually adjusted, the result being mutual compensation for the wavelength-selected scattering of light at the particles. (Blue light is more strongly scattered by small particles, red light by large particles.) Correspondingly, the scattering sheets have a neutral hue.

There are other known sheets which can be used for applications in lighting technology. By way of example, these sheets are described in JP 8-198976, JP 5-51480 and JP 2000-296580.

A disadvantage of the sheets described above is firstly their less-than-ideal picture quality together with low scratch resistance of the screen.

The publication EP-A-0 561 551 describes a multilayer sheet with a scattering layer of a mixture of a transparent polymer and spherical particles (2-15 µm). These screens, too, have very low scratch resistance.

A problem with known rear-projection screens with scattering media is therefore that their imaging properties involve non-ideal scratch resistance. In particular, the known screens have relatively low image sharpness or relatively poor brightness distribution. Sometimes there are also colour accuracy problems. In addition, many screens do not meet mechanical requirements, and in particular here scratches have a disadvantageous optical effect.

In the light of the prior art stated and discussed herein, it was therefore an object of the present invention to provide rear-projection screens which permit particularly high picture quality together with high scratch resistance. In particular, the screens should permit high image sharpness and high resolution of the projected picture.

Furthermore, the images on the rear-projection screens should have particular colour accuracy.

Another object of the present invention was to provide rear-projection screens which have particularly uniform brightness distribution.

In addition, the rear-projection screens should have maximum mechanical stability. There should be no, or only slight, visibility here of scratches on the screen. In particular, damage should have no, or only slight, effect on the image reproduction capability of the screen.

Another object on which the invention was based was to provide rear-projection screens which are capable of particularly simple production. In particular, therefore, the rear-projection screens should be capable of production via extrusion.

Another object of the present invention, therefore, was to create rear-projection screens which have high picture steadiness. This means that the information presented can be observed over a long period without fatigue.

Another object of the present invention was to provide rear-projection screens whose size and shape can easily be adapted to the requirements.

In addition, the images on the rear-projection screens should have particularly good contrast.

Another object of the invention was to give the rear-projection screens high durability, in particular high resistance to UV irradiation or to weathering.

Another object on which the present invention was based was to provide rear-projection screens whose image properties involve only a slight degree of reflection.

In addition, the size of the screens should be capable of adjustment to the respective requirements. In particular, the thickness of the rear-projection screens should be capable of adjustment to any desired requirements, without any resultant impairment of picture quality or of scratch resistance.

The rear-projection screens described in claim 1 achieve these objects, and also achieve other objects which, although they are not specifically mentioned, are obvious or necessary consequences of the circumstances discussed herein. Useful modifications of the inventive rear-projection screens are protected by the subclaims dependent on claim 1.

Claim 24 achieves the underlying object in relation to the processes for producing rear-projection screens.

Rear-projection screens which permit particularly high picture quality and also very high optical scratch resistance can be provided, in that the concentration of the spherical scattering particles (A) $c_{PA}$, the thickness of the light-scattering polymethyl methacrylate layer $d_S$ and the size of the spherical scattering particles (A) $D_{PA}$ is selected in such a way that the ratio $c_{PA} * d_S / D_{PA}^3$ is in the range from 0.001 to 0.015% by weight*mm/µm³, the concentration of the spherical particles (B) $c_{PB}$, the thickness of the light-scattering polymethyl methacrylate layer $d_S$ and the size of the spherical particles (B) $D_{PB}$ is selected in such a way that the ratio $c_{PB} * d_S / D_{PB}^3$ is in the range from 0.000005 to 0.002% by weight*mm/µm³ and the ratio of the square of average surface roughness of the polymethyl methacrylate layer $R_Z$ to the third power of the size of the spherical particles (B) $R_Z^2 / D_{PB}^3$ is in the range from 0.0002 to 0.1300 µm⁻¹, where the rear-projection screen encompasses at least one light-scattering polymethyl methacrylate layer, which comprises a polymethyl methacrylate matrix and spherical scattering particles (A) and spherical particles (B) with a different median particle size $V_{50}$, where the spherical scattering particles (A) have a median size $V_{50}$ in the range from 0.1 to 40 µm, the difference between the refractive index of the spherical scattering particles (A) and that of the polymethyl methacrylate matrix being in the range from 0.02 to 0.2, where the spherical particles (B) have a median size $V_{50}$ in the range from 10 to 150 µm, the difference between the refractive index of the spherical particles (B) and that of the polymethyl methacrylate matrix being in the range from 0 to 0.2, and where the total concentration of the spherical scattering particles (A) and particles (B) is in the range from 1 to 60% by weight, based on the weight of the light-scattering polymethyl methacrylate layer.

The inventive measures achieve, inter alia, in particular the following advantages:

The rear-projection screens of the present invention may be adapted to individual requirements without any resultant impairment of picture quality and/or resistance scratch.

The rear-projection screens of the present invention can give a projected picture with high image sharpness and resolution.

The image on the inventive rear-projection screens has particular colour accuracy and high contrast.

The rear-projection screens provided according to the present invention have particularly uniform brightness distribution.

The rear-projection screens of the present invention moreover have high mechanical stability. Scratches on the screen are invisible or are only very slightly visible.

Pictures projected onto the inventive rear-projection screens moreover have high picture steadiness. Images can therefore be viewed over a long period without fatigue.

The rear-projection screens of the present invention moreover have a non-glossy, matt surface profile. The nature of the surface structure may, where appropriate, be varied without affecting the optical parameters other than gloss. This method can be used to reduce the extent of reflections which adversely affect the image on the screen.

The rear-projection screens of the present invention can moreover be produced in a particularly simple manner. The rear-projection screens can indeed in particular be produced by extrusion.

The inventive rear-projection screens have high resistance to weathering, in particular to UV irradiation.

The size and shape of the rear-projection screens can be adapted to requirements.

The light-scattering polymethyl methacrylate layer of the rear-projection screen according to the present invention comprises from 1 to 60% by weight, in particular from 3 to 55% by weight and preferably from 6 to 48% by weight, based on the weight of the light-scattering polymethyl methacrylate layer, of spherical scattering particles (A) and spherical particles (B).

The scattering particles (A) and the particles (B) are spherical. For the purposes of the present invention, the term spherical means that the particles preferably have a spherical shape, but it is clear to the person skilled in the art that, as a consequence of the methods of production, it is also possible that particles with some other shape may be present, or that the shape of the particles may deviate from the ideal spherical shape.

The term spherical therefore means that the ratio of the largest dimension of the particles to the smallest dimension is not more than 4, preferably not more than 2, each of these dimensions being measured through the centre of gravity of the particles. At least 70% of the particles are preferably spherical, particularly preferably at least 90%, based on the number of particles.

The median size $V_{50}$ of the scattering particles (A) is in the range from 0.1 to 40 µm, in particular from 1 to 35 µm, preferably from 2 to 30 µm, from 3 to 25 µm, in particular from 4 to 20 µm and particularly preferably from 5 to 15 µm.

These particles are known per se and can be obtained commercially. Among these are in particular plastics particles, and also particles composed of inorganic materials, e.g. aluminium hydroxide, aluminium potassium silicate (mica), aluminium silicate (kaolin), barium sulphate (BaSO$_4$), calcium carbonate, magnesium silicate (talc). Among these, particular preference is given to particles composed of plastic.

There is no particular restriction on the plastics particles which may be used according to the invention. The type of plastic used to produce the plastics particles is therefore substantially non-critical, but refraction of light takes place at the phase boundary between the plastic beads and the matrix plastic.

The refractive index $n_D$ of the plastics particles, measured for the sodium D line (589 nm) at 20° C., therefore differs from the refractive index $n_D$ of the matrix plastic by from 0.02 to 0.2 units.

The spherical scattering particles (A) preferably encompass crosslinked polystyrene, polysilicone and/or crosslinked poly(meth)acrylates.

One group of preferred plastics particles which are used as scattering agents comprises silicones. By way of example, particles of this type are obtained by hydrolysis and polycondensation of organotrialkoxysilanes and/or of tetraalkoxysilanes, these being described by the formulae

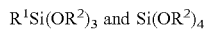
$R^1Si(OR^2)_3$ and $Si(OR^2)_4$ where $R^1$ is, by way of example, a substituted or unsubstituted alkyl group, an alkenyl group or a phenyl group, and the radical $R^2$ of the hydrolyzable alkoxy group is an alkyl group, such as methyl, ethyl or butyl, or an alkoxy-substituted hydrocarbon group, such as 2-methoxyethyl or 2-ethoxyethyl. Examples of organotrialkoxysilanes are methyltrimethoxysilane, methyltriethoxysilane, methyl-n-propoxysilane, methyltriisopropoxysilane and methyltris(2-methoxyethoxy)silane.

The abovementioned silane compounds, and processes for the production of spherical silicone particles, are known to those skilled in the art and are described in the specifications EP 1 116 741, JP 63-077940 and JP 2000-186148.

Scattering agents composed of silicone and particularly preferably used in the present invention are obtainable from GE Bayer Silicones with the trade names TOSPEARL® 120 and TOSPEARL® 3120.

The structure of another group of preferred plastics particles comprises:

b1) from 25 to 99.9 parts by weight of monomers which have aromatic groups as substituents, for example styrene, α-methylstyrene, ring-substituted styrenes, phenyl (meth)acrylate, benzyl (meth)acrylate, 2-phenylethyl (meth)acrylate, 3-phenylpropyl (meth)acrylate or vinyl benzoate; and also b2) from 0 to 60 parts by weight of an acrylic and/or methacrylic ester having 1 to 12 carbon atoms in the aliphatic ester radical, these being copolymerizable with the monomers b1), and mention may be made here of the following by way of example: methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl (meth)acrylate, norbornyl (meth)acrylate or isobornyl (meth)acrylate;

b3) from 0.1 to 15 parts by weight of crosslinking comonomers which have at least two ethylenically unsaturated groups copolymerizable by a free-radical route with b1) and, where appropriate, with b2), examples being divinylbenzene, glycol di(meth)acrylate, 1,4-butanediol di(meth)acrylate, allyl(meth)acrylate, triallyl cyanurate, diallyl phthalate, diallyl succinate, pentaerythritol tetra(meth)acrylate or trimethylolpropane tri(meth)acrylate, where the amounts of the comonomers b1), b2) and b3) give a total of 100 parts by weight.

Mixtures from which the plastics particles are produced particularly preferably comprise at least 80% by weight of styrene and at least 0.5% by weight of divinylbenzene.

The production of crosslinked plastics particles is known to those skilled in the art. For example, the scattering particles may be produced by emulsion polymerization, for example as described in EP-A 342 283 or EP-A 269 324, and very particularly preferably via organic-phase polymerization, for example as described in the German Patent Application P 43 27 464.1. The last-mentioned polymerization technique gives particularly narrow particle size distributions or, in other words, particularly small deviations of the particle diameters from the median particle diameter.

It is particularly preferable to use plastics particles whose heat resistance extends to at least 200° C., in particular at least 250° C., with no intended resultant restriction. The term heat-resistant here means that the particles are not subject to any substantial thermal degradation. Thermal degradation causes undesirable discoloration making the plastics material unusable.

Particularly preferred particles are, inter alia, obtainable from Sekisui with the trade names ®Techpolymer SBX-6, ®Techpolymer SBX-8 and ®Techpolymer SBX-12.

The scattering particles (A) described above may be used individually or in the form of a mixture of two or more types.

The particles (B) to be used according to the invention have a median size $V_{50}$ in the range from 10 to 150 µm, preferably from 15 to 70 µm and particularly preferably from 30 to 50 µm. When the refractive index of the particles is measured, the refractive index $n_D$ measured for the sodium D line (589 nm) at 20° C. differs from the refractive index $n_D$ of the matrix plastic by from 0 to 0.2 units.

The particles (B) may likewise be obtained commercially. The materials from which these particles are produced may be the same as those from which the scattering particles (A) are produced. Preference is given here likewise to the use of plastics particles.

The spherical particles (B) preferably encompass crosslinked polystyrene, polysilicone and/or crosslinked poly (meth)acrylates.

The particles (B) described above may be used individually or in the form of a mixture of two or more types.

The ratio by weight of the scattering particles (A) to the particles (B) is preferably in the range from 1:10 to 10:1, in particular from 1:5 to 5:1, particularly preferably from 1:3 to 3:1, and very particularly preferably from 1:2 to 2:1.

The difference between the median size $V_{50}$ of the scattering particles (A) and of the particles (B) is preferably at least 5 µm, in particular at least 10 µm, the particles (B) being larger than the scattering particles (A).

A laser extinction method may be used to determine the particle size, and also the particle size distribution. Use may be made here of a Galay-CIS from L.O.T. GmbH, the test method for determining particle size, and also particle size distribution, being given in the user manual. The median particle size, $V_{50}$, is the ponderal median, where the value for 50% by weight of the particles is smaller than or identical with this value and that for 50% by weight of these particles is greater than or identical with this value.

According to one particular aspect of the present invention, these particles have uniform distribution within the plastics matrix, with no significant aggregation or agglomeration of the particles. Uniform distribution means that the concentration of particles within the plastics matrix is in essence constant.

The light-scattering layer encompasses, alongside the spherical particles, a plastics matrix which comprises polymethyl methacrylate (PMMA). The light-scattering polymethyl methacrylate layer preferably encompasses at least 30% by weight, in particular at least 40% by weight, and particularly preferably at least 50% by weight, of polymethyl methacrylate, based on the weight of the light-scattering layer.

Polymethyl methacrylates are generally obtained via free-radical polymerization of mixtures which comprise methyl methacrylate. These mixtures generally comprise at least 40% by weight, preferably at least 60% by weight, and particularly preferably at least 80% by weight, of methyl methacrylate, based on the weight of the monomers.

Alongside this, these mixtures for preparing polymethyl methacrylates may comprise other (meth)acrylates which are copolymerizable with methyl methacrylate. The term (meth)acrylates encompasses methacrylates and acrylates, and also mixtures of the two.

These monomers are well known. They include (meth) acrylates derived from saturated alcohols, for example methyl acrylate, ethyl(meth)acrylate, propyl(meth)acrylate, n-butyl(meth)acrylate, tert-butyl (meth)acrylate, pentyl (meth)acrylate and 2-ethylhexyl (meth)acrylate;

(meth)acrylates derived from unsaturated alcohols, for example oleyl(meth)acrylate, 2-propynyl(meth)acrylate, allyl(meth)acrylate, vinyl meth)acrylate;

aryl(meth)acrylates, such as benzyl(meth)acrylate or phenyl (meth)acrylate, where in each case the aryl radicals may be unsubstituted or have up to four substituents;

cycloalkyl(meth)acrylates, such as 3-vinylcyclohexyl(meth) acrylate, bornyl(meth)acrylate;

hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate;

glycol di(meth)acrylates, such as 1,4-butanediol (meth)acrylate, (meth)acrylates of ether alcohols, for example tetrahydrofurfuryl(meth)acrylate, vinyloxyethoxyethyl (meth)acrylate;

amides and nitriles of(meth)acrylic acid, for example N-(3-dimethylaminopropyl) (meth)acrylamide, N-(diethylphosphono)(meth)acrylamide, 1-methacryloylamido-2-methyl-2-propanol;

sulphur-containing methacrylates, such as ethylsulphinylethyl(meth)acrylate, 4-thiocyanatobutyl(meth)acrylate, ethylsulphonylethyl(meth)acrylate, thiocyanatomethyl (meth)acrylate, methylsulphinylmethyl(meth)acrylate, bis((meth)acryloyloxyethyl)sulphide;

polyfunctional(meth)acrylates, such as trimethyloylpropane tri(meth)acrylate.

Besides the abovementioned (meth)acrylates, the compositions to be polymerized may also comprise other unsaturated monomers copolymerizable with methyl methacrylate and the abovementioned (meth)acrylates.

They include 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and these compounds may be used individually or in the form of a mixture.

The polymerization is generally initiated using known free-radical initiators. Among the preferred initiators are, inter alia, the azo initiators well-known to the person skilled in the art, for example AIBN and 1,1-azobiscyclohexanecarbonitrile, and also peroxy compounds, such as methyl ethyl ketone peroxide, acetylacetone peroxide, dilauryl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals.

The amount often used of these compounds is from 0.01 to 10% by weight, preferably from 0.5 to 3% by weight, based on the weight of the monomers.

Use may be made here of various poly(meth)acrylates which differ, for example in their molecular weight or in their monomeric constitution.

The matrix of the light-scattering layer may moreover comprise other polymers in order to modify its properties. Among these are, inter alia, polyacrylonitriles, polystyrenes, polyethers, polyesters, polycarbonates and polyvinyl chlorides. These polymers may be used individually or in the form of a mixture, and it is also possible here to use copolymers which are derivable from the abovementioned polymers.

The weight-average molar mass $M_w$ of the homo- and/or copolymers to be used according to the invention as matrix polymers may vary within a wide range, the molar mass usually being matched to the intended use and to the mode of processing of the moulding composition. However, it is generally in the range from 20 000 to 1 000 000 g/mol, preferably from 50 000 to 500 000 g/mol and particularly preferably from 80 000 to 300 000 g/mol, with no intended resultant restriction.

In one particular embodiment of the present invention, the matrix of the light-scattering polymethyl methacrylate layer has at least 0.70% by weight, preferably at least 80% by weight, and particularly preferably at least 90% by weight, of polymethyl methacrylate, based on the weight of the matrix of the light-scattering layer.

In one particular aspect of the present invention, the poly(meth)acrylates of the matrix of the light-scattering layer have a refractive index in the range from 1.46 to 1.54, measured for the sodium D line (589 nm) and at 20° C.

The moulding compositions for preparing the light-scattering layer may comprise conventional additives of any type. Among these are antistatic agents, antioxidants, mould-release agents, flame retardants, lubricants, dyes, flow improvers, fillers, light stabilizers, UV absorbers and organophosphorus compounds, such as phosphites or phosphonates, pigments, weathering stabilizers and plasticizers. However, the amount of additives is restricted in relation to the intended use. For example, the light-scattering property of the polymethyl methacrylate layer should not be excessively impaired by additives, nor should its transparency.

According to one particular aspect of the present invention, the moulding composition may, where appropriate, be given greater mechanical stability via an impact modifier. These impact modifiers for polymethacrylate plastics are well known, and, by way of example, the preparation and the structure of impact-modified polymethacrylate moulding compositions are described, inter alia, in EP-A 0 113 924, EP-A 0 522 351, EP-A 0 465 049 and EP-A 0 683 028.

Preferred impact-modified moulding compositions which can serve for preparing the matrix comprise from 50 to 99% by weight, in particular from 70 to 98% by weight, of polymethyl methacrylates, based on the weight of the moulding composition without scattering particles (A) and particles (B). These polymethyl methacrylates have been described above.

In one particular aspect of the present invention, the polymethyl methacrylates used to prepare impact-modified moulding compositions are obtained via free-radical polymerization of mixtures which encompass from 80 to 100% by weight, preferably from 90 to 98% by weight, of methyl methacrylate and, where appropriate, from 0 to 20% by weight, preferably from 2 to 10% by weight, of other comonomers capable of free-radical polymerization, these likewise having been listed above. Particularly preferred comonomers are, inter alia, $C_1$-$C_4$-alkyl(meth)acrylates, in particular methyl acrylate, ethyl acrylate or butyl methacrylate.

The average molar mass $M_w$ of the polymethyl methacrylates which can serve for preparing the impact-modified matrix is preferably in the range from 90 000 to 200 000 g/mol, in particular from 100 000 to 150 000 g/mol.

Preferred impact-resistant moulding compositions which can serve for preparing the matrix comprise from 0.5 to 55% by weight, preferably from 1 to 45% by weight, particularly preferably from 2 to 40% by weight, in particular from 3 to 35% by weight, of an impact modifier, based on the weight of the moulding composition without scattering particles (A) and particles (B), this being an elastomer phase composed of crosslinked polymer particles.

The impact modifier may be attained in a manner known per se via bead polymerization or via emulsion polymerization.

Preferred impact modifiers are crosslinked particles whose median particle size is in the range from 50 to 1000 nm, preferably from 60 to 500 nm and particularly preferably from 80 to 120 nm.

By way of example, these particles may be obtained via free-radical polymerization of mixtures which generally comprise at least 40% by weight, preferably from 50 to 70% by weight, of methyl methacrylate, from 20 to 80% by weight, preferably from 25 to 35% by weight, of butyl acrylate, and also from 0.1 to 2% by weight, preferably from 0.5 to 1% by weight, of a crosslinking monomer, e.g. a polyfunctional (meth)acrylate, e.g. allyl methacrylate, and which comprise comonomers which can be copolymerized with the abovementioned vinyl compounds.

Among the preferred comonomers are, inter alia, $C_1$-$C_4$-alkyl(meth)acrylates, such as ethyl acrylate or butyl methacrylate, preferably methyl acrylate, or other monomers including vinyl groups capable of polymerization, e.g. styrene. The mixtures for producing the abovementioned particles may preferably encompass from 0 to 10% by weight, with preference from 0.5 to 5% by weight, of comonomers.

Particularly preferred impact modifiers are polymer particles which have a two-layer, or particularly preferably a three-layer, core-shell structure. These core-shell polymers are described in EP-A 0 113 924, EP-A 0 522 351, EP-A 0 465 049 and EP-A 0 683 028, inter alia.

Particularly preferred impact modifiers based on acrylate rubber have the following structure, inter alia:

Core: Polymer with at least 90% by weight methyl methacrylate content, based on the weight of the core.

Shell 1: Polymer with at least 80% by weight butyl acrylate content, based on the weight of the first shell.

Shell 2: Polymer with at least 90% by weight methyl methacrylate content, based on the weight of the second shell.

The core may comprise not only the monomers mentioned but also other monomers, as may each of the shells. These have been mentioned previously, with particularly preferred comonomers having a crosslinking action.

By way of example, a preferred acrylate rubber modifier may have the following structure:

Core: copolymer composed of methyl methacrylate (95.7% by weight), ethyl acrylate (4% by weight) and allyl methacrylate (0.3% by weight)

S1: copolymer composed of butyl acrylate (81.2% by weight), styrene (17.5% by weight) and allyl methacrylate (1.3% by weight)

S2: copolymer composed of methyl methacrylate (96% by weight) and ethyl acrylate (4% by weight).

The core:shell(s) ratio of the acrylate rubber modifiers may vary within a wide range. The core:shell ratio C/S by weight is preferably in the range from 20:80 to 80:20, with preference from 30:70 to 70:30 in the case of modifiers with one shell, or in the case of modifiers with two shells the core:shell 1:shell 2 ratio C/S1/S2 is preferably in the range from 10:80:10 to 40:20:40, particularly preferably from 20:60:20 to 30:40:30.

The particle size of the core-shell modifier is usually in the range from 50 to 1000 nm, preferably from 100 to 500 nm and particularly preferably from 150 to 450 nm, with no intended resultant restriction.

Impact modifiers of this type are commercially obtainable from Mitsubishi with the trade name METABLEN® IR 441. It is also possible to obtain impact-modified moulding compositions.

Particularly preferred moulding compositions for preparing the plastics matrix are obtainable commercially from Röhm GmbH & Co. KG.

The thickness of the light-scattering polymethyl methacrylate layer is generally in the range from 0.05 to 5 mm, preferably in the range from 0.05 to 2 mm and particularly preferably in the range from 0.1 to 1 mm.

According to the invention, the concentration of the spherical scattering particles (A) $c_{PA}$, the thickness of the light-scattering polymethyl methacrylate layer $d_S$, and also the size of the spherical scattering particles (A) $D_{PA}$, is selected in such a way that the ratio of the product of concentration of the spherical scattering particles (A) $c_{PA}$ and thickness of the light-scattering polymethyl methacrylate layer to the third power of the particle size of the spherical scattering particles $c_{PA}*d_S/D_{PA}^3$ is in the range from 0.001 to 0.015% by weight*mm/µm³, preferably from 0.0025 to 0.009% by weight*mm/µm³.

The concentration of the spherical particles (B) $c_{PB}$, the thickness of the light-scattering polymethyl methacrylate layer $d_S$, and also the size of the spherical scattering particles (B) $D_{PB}$, is selected in such a way that the ratio of the product of concentration of the spherical scattering particles (B) $c_{PB}$ and thickness of the light-scattering polymethyl methacrylate layer to the third power of the particle size of the spherical scattering particles (B) $c_{PB}*d_S/D_{PB}^3$ is in the range from 0.000005 to 0.002% by weight*mm/µm³, preferably from 0.00004 to 0.0015% by weight*mm/µm³.

The ratio of the square of average surface roughness of the polymethyl methacrylate layer $R_Z$ to the third power of the size of the spherical particles (B) $R_Z^2/D_{PB}^3$ may preferably be in the range from 0.0002 to 0.1300 µm⁻¹, in particular from 0.0009 to 0.0900 µm⁻¹ and preferably from 0.00025 to 0.0600 µm⁻¹, and particularly preferably from 0.0025 to 0.0600 µm⁻¹.

In one particular embodiment of the screen of the present invention, the ratio of concentration of the spherical scattering particles (A) $c_{PA}$ to the thickness of the light-scattering polymethyl methacrylate layer $d_S$ $c_{PA}/d_S$ is greater than or equal to 2.5% by weight/mm, in particular greater than or equal to 4% by weight/mm.

In one particular aspect of the screen of the present invention, the ratio of concentration of the spherical particles (B) $c_{PB}$ to the thickness of the light-scattering polymethyl methacrylate layer $d_S$ $c_{PB}/d_S$ is greater than or equal to 2.5% by weight/mm, in particular greater than or equal to 4% by weight/mm.

The ratio calculated from thickness of the light-scattering polymethyl methacrylate layer $d_S$ and size of the spherical scattering particles $D_{PA}$ $d_S/D_{PA}$ is preferably in the range from 1 to 500, in particular from 1 to 250, preferably from 2.5 to 250 and particularly preferably from 2.5 to 150, with no intended resultant restriction.

The gloss $R_{85°}$ of the light-scattering polymethyl methacrylate layer is preferably smaller than or equal to 60, in particular smaller than or equal to 40 and particularly preferably smaller than 30.

The rear-projection screens of the present invention, in particular the light-scattering polymethyl methacrylate layer, have particularly high scratch resistance. In one particular aspect of the present invention, scratches produced on the screen using a force of at most 0.4 N, in particular at most 0.7 N, and particularly preferably at most 1.0 N are not visually detectable, with no intended resultant restriction.

This scratch resistance may be determined to DIN 53799 and DIN EN 438 by visual assessment of a damaged surface, the damage being brought about by a diamond acting on the surface with varying force.

According to one particular embodiment of the present invention, the average surface roughness $R_Z$ of the sheet is preferably in the range from 5 to 50 µm, in particular from 5 to 25 µm, preferably from 6 to 35 µm, in particular from 15 to 50 µm, particularly preferably from 6 to 30 µm.

The average surface roughness $R_Z$ may be determined to DIN 4768 using a Talysurf 50 tester from Taylor Hobson, $R_Z$ being the average roughness depth calculated from the averages of the individual roughness depths from five successive individual measurement traverses within the roughness profile.

The surface roughness $R_Z$ of the sheet is generally the result of the selection of the particles (B). This value may moreover be influenced by varying various parameters which are dependent on the nature of the production process.

Among these are the temperature of the melt during the extrusion process, a higher melt temperature giving a rougher surface. However, a factor which has to be considered here is that the temperature of the melt depends on the precise constitution of the moulding composition. The temperature of the melt is generally in the range from 150 to 300° C., preferably in the range from 200 to 290° C. These temperatures are based on the temperatures of the melt on discharge from the die.

The surface roughness may also be affected via the gap between the rollers used to polish the sheets. For example, if a polishing stack encompasses three rollers in an L arrangement, where the moulding composition is conducted from the die into the gap between roller 1 and roller 2 and has a 60-180° wrap around roller 2, the gap between roller 2 and roller 3 polishes the surfaces. If the gap between roller 2 and roller 3 is adjusted to the thickness of the sheet, the scattering particles on the sheet surface are pressed into the matrix, making the surface more polished. To achieve a rougher surface, this gap is generally adjusted to be somewhat larger than the thickness of the sheet to be produced, the relevant value frequently being in the range from 0.1 to 2 mm above the thickness of the sheet, preferably from 0.1 to 1.5 mm above the thickness of the sheet, with no intended resultant restriction. The surface roughness is also affected via the particle size and the thickness of the sheet, the dependencies being shown in the examples.

The light-scattering layer may be produced via known processes, preference being given to thermoplastic shaping processes. Once the particles have been added, light-scattering layers can be produced from the moulding compositions described above via conventional thermoplastic shaping processes.

According to one particular embodiment, a twin-screw extruder is used for the extrusion process or for the production of pellets of moulding compositions comprising scattering beads. In these processes, the plastics particles are preferably converted into the melt in the extruder. By this means it is possible to obtain melts which can give screens whose transmittance is particularly high.

The rear-projection screens here may be produced via a two-stage process in which the extrusion of the foil or sheet in a single-screw extruder is carried out downstream of an inventive sidefeeder compounding process in a twin-screw extruder and intermediate pelletization. The pellets obtained via the twin-screw extruder may be provided with particularly high proportions of scattering beads, making it simple to produce projection screens with varying content of scattering beads via blending with moulding compositions without scattering beads.

It is also possible to carry out a single-stage process in which the compounding of the spherical plastics particles into the melt takes place as described in a twin-screw extruder which, where appropriate, has a downstream pressure-increasing unit (e.g. melt pump) which is immediately followed by the extrusion die, which extrudes a sheet product. Surprisingly, the means described above can give rear-projection screens with a particularly low yellowness index.

The screens may moreover also be produced by injection moulding, in which case, however, the selection of the process parameters or the injection mould is to be such as to give a surface roughness in the inventive range.

The compounding of the matrix with the scattering particles preferably takes place via a twin-screw extruder, and the actual sheet extrusion can also use a single-screw extruder, with no intended resultant restriction.

Depending on the nature of the application, the light-scattering polymethyl methacrylate layer may be used as a screen. The thinner layers here may be used in the form of a film which can be wound up. Particularly preferred films are rendered impact-resistant by the methods described above.

A thin light-scattering polymethyl methacrylate layer may moreover be applied to a plastics sheet in order to increase its mechanical stability. This plastics sheet, which serves as a backing layer, preferably has a halved-intensity angle smaller than 6.5°, in particular smaller than or equal to 6°, preferably smaller than or equal to 5° and particularly preferably smaller than or equal to 3°. Correspondingly, the backing layer encompasses no, or only a very small amount of, spherical particles which have a scattering effect. This plastics sheet preferably comprises poly(meth)acrylates.

The gloss of the surface of the backing layer, at an angle of 60°, is preferably smaller than or equal to 70, with preference smaller than or equal to 60, in particular smaller than or equal to 40, particularly preferably smaller than or equal to 30 and very particularly preferably smaller than or equal to 15.

According to one preferred embodiment, the backing layer has an average surface roughness $R_Z$ in the range which is preferably from 2 to 45 µm, in particular from 3 to 40 µm, with preference from 5 to 35 µm. This method can eliminate refractions of the picture projected onto the screen in the room, without impairing picture quality.

According to one particular aspect of the present invention, the transmittance of the screen is greater than or equal to 25%, in particular greater than or equal to 40% and particularly preferably greater than or equal to 55%, these values in particular being achieved by screens without contrast-improving dyes.

According to one particular aspect of the present invention, the moulding composition may be coloured. Surprisingly, the contrast can be improved by this method. Particularly suitable materials for the colouring process are dyes known per se and/or carbon black. Particularly preferred dyes are commercially available. Among these are ®Sandoplast Red G and ®Sandoplast Yellow 2G, each from Clariant, and ®Macrolex Green 5B and ®Macrolex Violet 3R, each from Bayer. The concentration of these dyes depends on the desired perceived colour, and also on the thickness of the sheet. With no intended resultant restriction, this concentration is generally in the range from 0 to 0.8% by weight per dye, preferably from 0.000001 to 0.4% by weight, based on the total weight of the coloured moulding composition without scattering particles (A) and particles (B). The sum of the dye concentrations is preferably in the range from 0 to 1% by weight, preferably from 0.0001 to 0.6% by weight, based on the total weight of the coloured moulding composition without scattering particles (A) and particles (B). The loss of transmittance may at least to some extent be compensated via more powerful projectors.

The yellowness index of the screen is preferably smaller than or equal to 12, in particular smaller than or equal to 10, with no intended resultant restriction.

One particular embodiment of the screen of the present invention has a halved-intensity angle greater than or equal to 15°, in particular greater than or equal to 25°.

According to one particular aspect of the present invention, the scattering power of the screen is greater than or equal to 0.15, in particular greater than or equal to 0.35, with no intended resultant restriction.

According to one preferred embodiment, the surface of the inventive polymethyl methacrylate sheets has a matt appearance when light is reflected from the scattering sheet. Gloss measurement using a reflectometer to DIN 67530 may be used for characterization. The gloss of the sheets at an angle of 85° is preferably below 60, particularly preferably below 40 and very particularly preferably below 30.

There is no restriction on the size and shape of the rear-projection screen of the present invention. However, the screen usually has the shape of a rectangular panel, because it is the usual format for presenting pictures.

The length of this type of rear-projection screen is preferably in the range from 25 to 10 000 mm, with preference from 50 to 3000 mm and particularly preferably from 200 to 2000 mm. The width of this particular embodiment is generally in the range from 25 to 10 000 mm, preferably from 50 to 3000 mm and particularly preferably from 200 to 2000 mm. Two or more of these screens may be brought together in order to provide a particularly large projection surface.

According to one particular embodiment, the screen has particularly high weathering resistance to DIN EN ISO 4892, Part 2—Methods of exposure to laboratory light sources: xenon arc sources.

The inventive rear-projection screens may be used for other applications in lighting technology, for example as diffuser sheets in LCD monitors.

Examples and comparative examples are used below for more detailed description of the invention, but there is no intention that the invention be restricted to these examples.

A) Test Methods

Average roughness $R_Z$ was determined to DIN 4768 using Taylor Hobson Talysurf 50 test equipment.

Transmittance $\tau_{D65/2}°$ was determined to DIN 5036 using Perkin Elmer Lambda 19 test equipment.

Yellowness index $\tau_{D65/10}°$ was determined to DIN 6167 using Perkin Elmer Lambda 19 test equipment.

R85° gloss was determined at 85° to DIN 67530 using a laboratory reflectometer from Dr. Lange.

Scattering power and halved-intensity angle were determined to DIN 5036 using a GO-T-1500 LMT goniometer test unit.

The various rear-projection screens were also assessed visually on the basis of the criteria shown in Table 1.

The projector used here was an Epson EMP-713. The test picture was assessed at a distance of about 1-1.5 m from the image at various angles (0°=perpendicular to the projection normal, 30° and 60°). The distance of the projector from the projection sheet was about 85 cm and the image diagonal was about 50 cm.

Technical data for Epson EMP 713 projector:

Projection system: dichroitic mirror and lens system, pixels: 2359296 pixels (1024×768)*3, brightness: 1200 ANSI lumens, contrast: 400:1, picture brilliance: 85%, colour output: 24 bit, 16.7 million colours, H: 15-92 kHz, V: 50-85 Hz, lamp: 150 watt UHE, video resolution: 750 TV lines

TABLE 1

| Criterion | Property |
|---|---|
| Hot spot | A hot spot is light distribution associated with the conical beam of light of the projection illumination system. A hot spot is therefore a conical beam of light with substantially greater brightness in the centre than at the margin of the image. If the hot spot is very pronounced, the projector lamp is visually detectable. |
| Brightness distribution | Brightness distribution is likewise assessed via the distribution of light on the image surface and therefore characterizes the extent to which the illumination of the image extends from the centre to the margin. |
| Picture sharpness | Picture sharpness is the degree of perceived clarity of the test picture. |
| Resolution | The resolution of the image gives the extent to which fine structures are distorted on the sheet assessed. |
| Picture steadiness | Picture steadiness is the extent to which the observer can receive the projected information over a prolonged period without eye strain. |

The tables indicate very good properties by ++, good properties by +, satisfactory properties by 0, unsatisfactory properties by -, very unsatisfactory properties by -- and inadequate properties by ---.

B) Preparation of Plastics Particles

Plastics Particles B1

To prepare spherical plastics particles, use was made of an aluminium hydroxide Pickering stabilizer, prepared by precipitation from aluminium sulphate and soda solution directly prior to starting the actual polymerization. To this end, 16 g of $Al_2(SO_4)_3$, 0.032 g of complexing agent (Trilon A) and 0.16 g of emulsifier (emulsifier K 30 obtainable from Bayer AG; sodium salt of a $C_{15}$ paraffinsulphonate) were first dissolved in 0.8 l of distilled water. A 1N sodium carbonate solution was then added, with stirring and at a temperature of about 40° C., to the aluminium sulphate dissolved in water, the resultant pH being in the range from 5 to 5.5. This procedure gave a colloidal dispersion of the stabilizer in the water.

After the precipitation of the stabilizer, the aqueous phase was transferred to a glass beaker. 110 g of methyl methacrylate, 80 g of benzyl methacrylate, 10 g of allyl methacrylate, 4 g of dilauryl peroxide and 0.4 g of tert-butyl 2-ethylperhexanoate were added into the beaker. This mixture was dispersed by a disperser (UltraTurrax S50N-G45MF, Janke and Kunkel, Staufen) for 15 minutes at 7000 rpm.

Following this exposure to shear, the reaction mixture was charged to the reactor, which had been preheated to the appropriate reaction temperature of 80° C., and polymerized with stirring (600 rpm) at about 80° C. (polymerization temperature) for 45 minutes (polymerization time). A post-reaction phase then followed at about 85° C. internal temperature for 1 hour. After cooling to 45° C., the stabilizer was converted into water-soluble aluminium sulphate by adding 50% strength sulphuric acid. The beads were worked up by filtering the resultant suspension through a commercially available textile filter and drying at 50° C. for 24 hours in a heated cabinet.

The size distribution was studied by laser extinction. The median size $V_{50}$ of the particles was 18.6 μm. The beads had a spherical shape, no fibres being detected. No coagulation occurred. The resultant particles are termed plastics particles B1 below.

Plastics Particles B2

To prepare spherical plastics particles, use was made of an aluminium hydroxide Pickering stabilizer, prepared by precipitation from aluminium sulphate and soda solution (1N sodium carbonate solution) directly prior to starting the actual polymerization. To this end, 38 L of deionized water, 400 g of aluminium sulphate and 8 g of complexing agent (Trilon A) were first used to form an initial charge, with stirring (330 rpm) using an impeller stirrer in a $N_2$-flushed 100 L V4A tank with baffle, Ni—Cr—Ni temperature sensor and circulatory heating system. 1760 g of soda solution are then added to precipitate the aluminium hydroxide, as are emulsifier K30 dispersing agent (4 g) obtainable from Bayer AG (sodium salt of a C15 paraffinsulphonate) and polywax 5000/6000 (4 g) obtainable from Hoechst (polyethylene glycol with a molecular weight in the range from 5000 to 6000), each dissolved in 240 ml of deionized water. The pH after the precipitation was about 5.3, giving colloidal distribution of the stabilizer in water.

A monomer mixture composed of 6900 g of methyl methacrylate, 3000 g of styrene, 100 g of glycol dimethacrylate, 200 g of dilauroyl peroxide, 20 g of tert-butyl 2-ethylperhexanoate and 50 g of 2-ethylhexyl thioglycolate was then added, again at room temperature.

The heating phase takes place to a temperature of 80° C., during which the reactor was sealed so as to be pressure-tight at an internal tank temperature of 40° C. and introduction of $N_2$ was stopped. Within the next 115 minutes, the internal temperature rises to about 87° C. and the pressure rises from 0.70 to 0.92 bar. After the temperature maximum had been reached, the reaction mixture was heated to about 87-88° C. and stirring of the mixture was continued at this temperature for about one hour, the stirrer speed being reduced to 200 rpm. After the reaction mixture had been cooled, the tank was depressurized at a temperature of 46° C. and 400 ml of 50% strength sulphuric acid were then added, converting the aluminium hydroxide into soluble aluminium sulphate with resultant precipitation of the suspension polymer. For work-up of the beads, the suspension obtained was filtered through a stoneware suction funnel with textile filter, washed until neutral and dried at 50° C. for about 20 hours in a heated cabinet.

Size distribution was studied by laser extinction. The median size $V_{50}$ of the particles was 40.5 μm. The beads had a spherical shape, no fibres being detected. No coagulation occurred. The resultant particles are termed plastics particles B2 below.

C) EXAMPLES 1-4

Various rear-projection screens were produced via extrusion. To this end, various compounded materials comprising scattering beads composed of plastics particles B1, were extruded with plastics particles B2, plastics particles based on styrene and having a size $V_{50}$ of about 8.4 µm, these being commercially obtainable from Sekisui with the trade mark ®Techpolymer SBX-8, and a PMMA moulding composition obtainable from Röhm GmbH & Co. KG (copolymer composed of 97% by weight of methyl methacrylate and 3% by weight of methyl acrylate) to give plastics sheets. A BREYER Ø60 mm extruder was used. The temperature of the melt on discharge from the die was generally 270° C. In particular in the examples, the adjustment of the polishing stack was generally such as to achieve maximum surface roughness.

The proportion of plastics particles in the polymethyl methacrylate matrix is shown in table 2, as is the thickness of the sheets.

TABLE 2

|  | Example 1 | Example 2 | Example 3 | Example 4 |
|---|---|---|---|---|
| Thickness [mm] | 0.5 | 0.5 | 0.5 | 0.5 |
| PMMA matrix [% by wt.] | 88 | 82 | 88 | 82 |
| ® SBX8 [% by wt.] | 6 | 6 | 6 | 6 |
| Plastics particles B1 [% by wt.] | 0 | 0 | 6 | 12 |
| Plastics particles B2 [% by wt.] | 6 | 12 | 0 | 0 |

The rear-projection screens obtained were studied in accordance with the test methods described above, and the test results obtained here are given in table 3.

TABLE 3

|  | Example 1 | Example 2 | Example 3 | Example 4 |
|---|---|---|---|---|
| Transmittance [%] | 71.4 | 73.14 | 71.95 | 71.34 |
| Yellowness Index YI ($\tau_{D65/10°}$) | 5.36 | 4.86 | 5.2 | 5.3 |
| Scattering power σ | 0.6 | 0.56 | 0.6 | 0.6 |
| Halved-intensity angle γ [°] | 49 | 43 | 49 | 49 |
| $R_Z$ [µm] | 15.0 | 25.4 | 6.1 | 7.6 |
| R85° gloss | 14.8 | 4.6 | 25.3 | 8.6 |
| $c_{PA} * d_S/D_{PA}^3$ [% by wt. * mm/µm³] | 0.00505 | 0.00505 | 0.00505 | 0.00505 |
| $c_{PB} * d_S/D_{PB}^3$ [% by wt. * mm/µm³] | 0.000045 | 0.000090 | 0.000466 | 0.00093 |
| $R_Z^2/D_{PB}^3$ | 0.00338 | 0.00968 | 0.00263 | 0.00416 |
| Hot spot | ++ | ++ | ++ | ++ |
| Brightness distribution | ++ | ++ | ++ | ++ |
| Picture sharpness | + | + | +/++ | ++ |
| Resolution | Fine-very fine | Fine-very fine | Very fine | Very fine |
| Picture steadiness | + | 0/+ | + | + |

The visual scratch resistance of these extrudates was also studied.

Scratch resistance was tested via the penetration depth of a diamond $t_R$=f (load), using the Taber Industries 203 scratch tester, the method being based on DIN 53799 and DIN EN 438: diamond gouge with 90° cone angle, peak radius 90 µm, direction of rotation anticlockwise. The loads used are shown in table 4.

A black substrate was used for visual assessment (reflection test). The tests (roughness, gloss) were carried out on the upper side of the test extrudates.

The results obtained are listed in table 4.

TABLE 4

| Load on diamond | Example 1 | Example 2 |
|---|---|---|
| 0.4 N | No discernible damage | No discernible damage |
| 0.7 N | No discernible damage | No discernible damage |
| 1.0 N | No discernible damage | No discernible damage |
| 1.5 N | No discernible damage | No discernible damage |
| 2.0 N | Hardly any discernible damage (additional reflections, markedly angle-dependent) | Hardly any discernible damage (additional reflections, markedly angle-dependent) |
| 3.0 N | Discernible damage | Discernible damage (additional reflections) |

| Load on diamond | Example 3 | Example 4 |
|---|---|---|
| 0.4 N | No discernible damage | No discernible damage |
| 0.7 N | No discernible damage | No discernible damage |
| 1.0 N | No discernible damage | No discernible damage |
| 1.5 N | Hardly any discernible damage (additional reflections, markedly angle-dependent) | Hardly any discernible damage (additional reflections, markedly angle-dependent) |
| 2.0 N | Hardly any discernible damage (additional reflections, markedly angle-dependent) | Hardly any discernible damage (additional reflections, markedly angle-dependent) |
| 3.0 N | Discernible damage | Discernible damage (additional reflections) |

D) EXAMPLES 5 AND 6

The production process described above in examples 1 to 4 was in essence repeated, but impact modifiers (®Metablen IR 441, obtainable from Mitsubishi) were also added. In addition, a coloured rear-projection screen was produced, likewise rendered impact-resistant. The dye was composed of a mixture of 52.66% by weight of ®Sandoplast Red G, 0.84% by weight of ®Sandoplast Yellow 2G (each obtainable from Clariant) and 39.22% by weight of ®Macrolex Green 5B and 7.28% by weight of ®Macrolex Violet 3R (each obtainable from Bayer).

The proportion of plastics particles in the polymethyl methacrylate matrix is shown in table 5, as is the thickness of the sheets.

TABLE 5

|  | Example 1 | Example 5 | Example 6 |
|---|---|---|---|
| Thickness [mm] | 0.5 | 0.5 | 0.5 |
| PMMA matrix [parts by wt.] | 88 | 53 | 53 |
| ® SBX8 [% by wt.] | 6 | 6 | 6 |
| Plastics particles B1 [% by wt.] | 0 | 0 | 0 |
| Plastics particles B2 [% by wt.] | 6 | 6 | 6 |
| ® Metablen IR 441 [parts by wt.] | 0 | 35 | 35 |
| Dye [parts by wt.] | 0 | 0 | 0.02142 |

The rear-projection screens obtained were studied in accordance with the test methods described above, and the test results obtained here are given in table 6.

The mechanical properties of the rear-projection screens were also studied. Tensile strength, tensile strain at break, and modulus of elasticity were determined to ISO 527-2, as was reflectance to DIN 5036.

TABLE 6

|  | Example 1 | Example 5 | Example 6 |
|---|---|---|---|
| Transmittance [%] | 71.4 | 73.43 | 39.74 |
| Yellowness Index YI ($\tau_{D65/10°}$) | 5.36 | 4.88 | — |
| Scattering power σ | 0.6 | 0.56 | 0.59 |
| Halved-intensity angle γ [°] | 49 | 43 | 48 |
| Reflectance ($\rho_{D65/2°}$) [%] | 26.72 | 25.26 | 11.21 |
| Tensile strength (σ-M; 5 mm/min) [MPa] | 64.6 | 34.5 | 33.8 |
| Modulus of elasticity (1 mm/min) [MPa] | 3258 | 1642 | 1621 |
| Tensile strain at break (ε-B; 5 mm/min) [%] | 3.4 | 23.6 | 17.1 |
| $R_Z$ [μm] | 15.0 | 16.0 | 20.1 |
| R85° gloss | 14.8 | 9.9 | 5.4 |
| Hot spot | ++ | ++ | ++ |
| Brightness distribution | ++ | ++ | ++ |
| Picture sharpness | + | + | + |
| Resolution | Fine-very fine | Fine-very fine | Fine-very fine |
| Picture steadiness | + | + | + |

Rear-projection Screens for 3D Projection

The inventive rear-projection screen may also be used for 3D projection of pictures or films.

In the 3D projection process, the source of the picture is two superposed projected images, the image content of which is in principle the same except that it involves a certain shift, e.g. representing the distance between the eyes. An example of a principle often used is the polarization method. Projectors operating with polarized light are used to shine the light from the two projectors with different directions of polarization onto the rear-projection screen.

The viewer views the picture through spectacles equipped with separate appropriate polarization filters for the right and the left eye. The human brain processes the two different perceived images to give a three-dimensional perceived picture.

For 3D projection purposes, the inventive rear-projection screens may preferably be manufactured from extruded polymethyl methacrylate in the form of a sheet or film encompassing at least one light-scattering layer composed of extruded polymethyl methacrylate, the total path difference due to optical birefringence being at most 25 nm, preferably at most 15 nm, particularly preferably at most 5 nm.

The factor which has to be considered here is that the extrusion process always brings about a certain orientation of the molecular chains in the direction of extrusion. This orientation leads to birefringence properties, to some extent depolarizing the polarized light of the two projected images, this being, of course, undesirable.

The extruded polymethyl methacrylate for rear-projection screens intended for 3D projection is therefore particularly preferably subjected to thermal post-treatment after extrusion. During the thermal post-treatment, recovery takes place, and reduces the orientation of the polymer molecules back to a substantially lower level. The result is a great reduction in the level of the birefringence property initially possessed by the material.

By way of example, the thermal post-treatment of extruded polymethyl methacrylate in the form of films or sheets intended for rear-projection screens for 3D projection may take place in the range from 110 to 190° C., preferably from 120 to 160° C., for from 5 minutes to 24 hours, preferably from 10 minutes to 2 hours, depending on the constitution of the material and its thickness. Optimization is easily achieved here by a person skilled in the art. When the thermal recovery process is carried out the material may be supported from below, or preferably suspended.

The person skilled in the art is aware of suitable test methods for measuring the path difference due to optical birefringence. By way of example, the path difference may be measured with the aid of a polarizing microscope in combination with an Ehringhaus tilting compensator.

The invention claimed is:

1. Rear-projection screen that comprises at least one light-scattering polymethyl methacrylate layer, the rear-projection screen comprising:

a polymethyl methacrylate matrix;

spherical scattering particles (A); and spherical particles (B) with a median particle size $V_{50}$ different than the median particle size of the spherical scattering particles (A)

wherein the spherical scattering particles (A) have a median size $V_{50}$ in the range from 0.1 to 40 μm, the difference between the refractive index of the spherical scattering particles (A) and that of the polymethyl methacrylate matrix being in the range from 0.02 to 0.2, wherein the spherical particles (B) have a median size V50 in the range from 10 to 150 μm, the difference between the refractive index of the spherical particles (B) and that of the polymethyl methacrylate matrix being in the range from 0 to 0.2, and wherein the total concentration of the spherical scattering particles (A) and particles (B) is in the range from 1 to 60% by weight, based on the weight of the light-scattering polymethyl methacrylate layer, wherein the concentration of the spherical scattering particles (A) $c_{PA}$, the thickness of the light-scattering polymethyl methacrylate layer $d_S$ and the size of the spherical scattering particles (A) $D_{PA}$ is selected in such a way that the ratio $c_{PA}*d_S/D_{PA}^3$ is in the range from 0.001 to 0.015% by weight*mm/μm³, the concentration of the spherical particles (B) $c_{PB}$, wherein the thickness of the light-scattering polymethyl methacrylate layer $d_S$ and the size of the spherical particles (B) $D_{PB}$ is selected in such a way that the ratio $c_{PB}*d_S/D_{PB}^3$ is in the range from 0.000005 to 0.002% by weight*mm/μm³ and the ratio of the square of average surface roughness of the polymethyl methacrylate layer $R_Z$ to the third power of the size of the spherical particles (B) $R_Z^2/D_{PB}^3$ is in the range from 0.0002 to 0.1300 μm$^{-1}$.

2. Rear-projection screen according to claim 1, wherein the ratio of the square of average surface roughness of the polymethyl methacrylate layer $R_Z$ to the third power of the size of the spherical particles (B) $R_Z^2/D_{PB}^3$ is in the range from 0.0025 to 0.0600 μm$^{-1}$.

3. Rear-projection screen according to claim 1, wherein the ratio of concentration of the particles (B) $c_{PB}$ to the thickness of the light-scattering polymethyl methacrylate layer $d_S$ $c_{PB}/d_S$ is greater than or equal to 2.5% by weight/mm.

4. Rear-projection screen according to claim 1, wherein the gloss R85° of the light-scattering polymethyl methacrylate layer is smaller than or equal to 40.

5. Rear-projection screen according to claim 1, that wherein the ratio $c_{PA}*d_S/D_{PA}^3$ is in the range from 0.0025 to 0.009% by weight*mm/$82$ m².

6. Rear-projection screen according to claim 1, wherein the ratio $c_{PB}*d_S/D_{PB}^3$ is in the range from 0.00004 to 0.0015% by weight*mm/µm².

7. Rear-projection screen according to claim 1, wherein the thickness of the light-scattering polymethyl methacrylate layer is in the range from 0.05 to 1 mm.

8. Rear-projection screen according to claim 1, wherein the spherical scattering particles (A) and/or spherical particles (B) encompass crosslinked polystyrene, polysilicone and/or crosslinked poly(meth)acrylates.

9. Rear-projection screen according to claim 1, wherein the light-scattering polymethyl methacrylate layer has been coloured.

10. Rear-projection screen according to claim 1, wherein the matrix of the light-scattering polymethyl methacrylate layer has a refractive index in the range from 1.46 to 1.54, measured for the sodium D line (589 nm) and at 20° C.

11. Rear-projection screen according to claim 1, wherein the average surface roughness $R_Z$ of the screen is in the range from 4 to 50 µm.

12. Rear-projection screen according to claim 1, wherein the median size $V_{50}$ of the spherical particles (B) is greater by at least 5 µm than the median size of the scattering particles (A).

13. Rear-projection screen according to claim 1, wherein the median size V50 of the spherical scattering particles (A) is in the range from 5 to 20 µm.

14. Rear-projection screen according to claim 1, wherein the median size $V_{50}$ of the spherical particles (B) is in the range from 15 to 60 µm.

15. Rear-projection screen according to claim 1, wherein scratches produced on the screen using a force of at most 0.7 N are not visually detectable.

16. Rear-projection screen according to claim 1, wherein the screen also encompasses a backing layer which has a halved-intensity angle smaller than 6.5°.

17. Rear-projection screen according to claim 16, wherein the backing layer has an average surface roughness $R_Z$ in the range from 3 to 40 µm.

18. Rear-projection screen according to claim 16, wherein the backing layer comprises poly(meth)acrylates.

19. Rear-projection screen according to claim 1, wherein the thickness of the rear-projection screen is in the range from 0.05 to 5 mm.

20. Rear-projection screen according to claim 1, wherein the transmittance of the screen is greater than or equal to 25%.

21. Rear-projection screen according to claim 1, wherein the yellowness index of the screen is smaller than or equal to 12.

22. Rear-projection screen according to claim 1, wherein the halved-intensity angle of the screen is greater than or equal to 15°.

23. Rear-projection screen according to claim 1, wherein the scattering power of the screen is greater than or equal to 0.15.

24. Rear-projection screen according to claim 1, wherein the screen is composed of extruded polymethyl methacrylate with a path difference of at most 25 nm due to optical birefringence.

25. A process for producing a rear-projection screen according to claim 1, comprising:

extruding a moulding composition that comprises polymethyl methacrylate, spherical scattering particles (A), and spherical particles (B).

26. The process according to claim 25, comprising:

extuding screen or a film; and heating the extruded screen or the foil to 110-190° C. for from 5 minutes to 24 hours.

* * * * *